US011100669B1

(12) United States Patent
Zhou et al.

(10) Patent No.: US 11,100,669 B1
(45) Date of Patent: Aug. 24, 2021

(54) MULTIMODAL THREE-DIMENSIONAL OBJECT DETECTION

(71) Applicants: Yin Zhou, Cupertino, CA (US); Vishwanath A. Sindagi, Edison, NJ (US); Cuneyt Oncel Tuzel, Cupertino, CA (US)

(72) Inventors: Yin Zhou, Cupertino, CA (US); Vishwanath A. Sindagi, Edison, NJ (US); Cuneyt Oncel Tuzel, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 180 days.

(21) Appl. No.: 16/534,144

(22) Filed: Aug. 7, 2019

Related U.S. Application Data (60) Provisional application No. 62/795,620, filed on Jan. 23, 2019, provisional application No. 62/731,371, filed on Sep. 14, 2018.

(51) Int. Cl.
   *G06T 7/73* (2017.01)
   *G01S 17/89* (2020.01)

(52) U.S. Cl.
   CPC ............... *G06T 7/73* (2017.01); *G01S 17/89* (2013.01); *G06T 2207/10028* (2013.01); *G06T 2207/20084* (2013.01)

(58) Field of Classification Search
   CPC ... G06T 7/70–7/77; G06T 2207/10028; G06T 2207/20084; G01S 17/89
   See application file for complete search history.

(56) References Cited

U.S. PATENT DOCUMENTS

| 8,553,989 | B1 | 10/2013 | Owechko et al. |
| 8,605,998 | B2 | 12/2013 | Samples et al. |
| 8,855,849 | B1 | 10/2014 | Ferguson et al. |
| 9,495,764 | B1 | 11/2016 | Boardman et al. |
| 10,109,198 | B2 | 10/2018 | Qiu et al. |
| 2010/0097458 | A1 | 4/2010 | Zhang et al. |
| 2010/0098290 | A1 | 4/2010 | Zhang et al. |
| 2010/0098297 | A1 | 4/2010 | Zhang |
| 2010/0104199 | A1 | 4/2010 | Zhang et al. |

(Continued)

OTHER PUBLICATIONS

Zhou, Y., et al., "VoxelNet: End-to-End Learning for Point Cloud Based 3D Object Detection", Nov. 17, 2017, https://arxiv.org/abs/1711.06396 (10 pp).

*Primary Examiner* — Justin P. Misleh
(74) *Attorney, Agent, or Firm* — Young Basile Hanlon & MacFarlane, P.C.

(57) ABSTRACT

A method includes obtaining surface samples that represent three-dimensional locations of surfaces of an environment; generating a voxelized representation of the surfaces of the environment in three-dimensional space using the surface samples; obtaining an image that shows the surfaces of the environment; associating each of the surface samples with image information that corresponds to a portion of the image that is spatially correlated with a respective one of the surface samples; determining voxel features for voxels from the voxelized representation based on the surface samples and the image information using a first trained machine learning model, wherein the voxel features each describe three-dimensional shapes present within a respective one of the voxels; and detecting objects based on the voxel features.

22 Claims, 6 Drawing Sheets

(56) References Cited

U.S. PATENT DOCUMENTS

| | | |
|---|---|---|
| 2010/0121577 A1 | 5/2010 | Zhang et al. |
| 2011/0026770 A1 | 2/2011 | Brookshire |
| 2014/0368493 A1 | 12/2014 | Rogan et al. |
| 2014/0368807 A1 | 12/2014 | Rogan |
| 2015/0120244 A1 | 4/2015 | Ma et al. |
| 2015/0138310 A1 | 5/2015 | Fan et al. |
| 2016/0171316 A1 | 6/2016 | Fritsch et al. |
| 2016/0217335 A1 | 7/2016 | Levi et al. |
| 2016/0221592 A1 | 8/2016 | Puttagunta et al. |
| 2016/0291155 A1 | 10/2016 | Nehmadi et al. |
| 2018/0074200 A1 | 3/2018 | Liu et al. |
| 2018/0189578 A1 | 7/2018 | Yang et al. |
| 2018/0232947 A1 | 8/2018 | Nehmadi et al. |
| 2018/0322623 A1 | 11/2018 | Memo et al. |
| 2019/0188541 A1* | 6/2019 | Wang .................. G06K 9/6221 |
| 2020/0025935 A1* | 1/2020 | Liang .................... G06K 9/629 |

* cited by examiner

MULTIMODAL THREE-DIMENSIONAL OBJECT DETECTION

CROSS-REFERENCE TO RELATED APPLICATIONS

This application claims the benefit of U.S. Provisional Application No. 62/795,620 filed on Jan. 23, 2019 and U.S. Provisional Application No. 62/731,371 filed on Sep. 14, 2018, the contents of which are hereby incorporated by reference in their entireties for all purposes.

TECHNICAL FIELD

This disclosure relates to three-dimensional object detection.

BACKGROUND

Some three-dimensional sensor systems output information that represents the presence of objects at discrete locations. This type of information may be output in the form of a point cloud and can be interpreted in various ways. Object detection systems that rely solely on three-dimensional sensor outputs may be subject to errors when environmental features coincidentally resemble objects being detected.

SUMMARY

Systems and methods for multimodal three-dimensional object detection are described herein.

One aspect of the disclosure is a method that includes obtaining surface samples that represent three-dimensional locations of surfaces of an environment and generating a voxelized representation of the surfaces of the environment in three-dimensional space using the surface samples. The method also includes obtaining an image that shows the surfaces of the environment and associating each of the surface samples with image information that corresponds to a portion of the image that is spatially correlated with a respective one of the surface samples. The method also includes determining voxel features for voxels from the voxelized representation based on the surface samples and the image information using a first trained machine learning model, wherein the voxel features each describe three-dimensional shapes that are present within a respective one of the voxels. The method also includes detecting objects based on the voxel features.

Another aspect of the disclosure is an apparatus that includes a three-dimensional sensor system that is configured to obtain surface samples that represent three-dimensional locations of surfaces of an environment, an image sensing system that is configured to obtain an image that shows the surfaces of the environment, and an object detection system. The object detection system is configured to generate a voxelized representation of the surfaces of the environment in three-dimensional space using the surface samples and associate each of the surface samples with image information that corresponds to a portion of the image that is spatially correlated with a respective one of the surface samples. The object detection system is further configured to determine voxel features for voxels from the voxelized representation based on the surface samples and the image information using a first trained machine learning model, wherein the voxel features each describe three-dimensional shapes present within a respective one of the voxels, and detect objects based on the voxel features.

Another aspect of the disclosure is a method that includes obtaining surface samples that represent three-dimensional locations of surfaces of an environment and generating a voxelized representation of the surfaces of the environment in three-dimensional space using the surface samples. The method also includes obtaining an image that shows the surfaces of the environment and associating voxels from the voxelized representation with image information that corresponds to a portion of the image that is spatially correlated with a respective one of the voxels. The method also includes determining voxel features for voxels from the voxelized representation based on the surface samples using a first trained machine learning model, wherein the voxel features each describe three-dimensional shapes present within a respective one of the voxels. The method also includes combining the voxel features for the voxels with image information for respective ones of the voxels to define concatenated features, and detecting objects based on the concatenated features.

Another aspect of the disclosure is an apparatus that includes a three-dimensional sensor system that is configured to obtain surface samples that represent three-dimensional locations of surfaces of an environment, an image sensing system that is configured to obtain an image that shows the surfaces of the environment, and an object detection system. The object detection system is configured to generate a voxelized representation of the surfaces of the environment in three-dimensional space using the surface samples, associate voxels from the voxelized representation with image information that corresponds to a portion of the image that is spatially correlated with a respective one of the voxels, and determine voxel features for the voxels from the voxelized representation based on the surface samples using a first trained machine learning model, wherein the voxel features each describe three-dimensional shapes present within a respective one of the voxels. The object detection system is further configured to combine the voxel features for the voxels with image information for respective ones of the voxels to define concatenated features and detect objects based on the concatenated features.

DETAILED DESCRIPTION

The systems and methods that are described herein implement object detection using three-dimensional sensor information and image information in combination.

Two-dimensional object detection is a greatly researched topic in the computer vision community. Convolutional neural network (CNN) based object detection techniques perform well when applied to two-dimensional images. These techniques cannot, however, be directly applied to three-dimensional object detection because the input modalities are fundamentally different.

LiDAR sensors enable accurate localization of objects in three-dimensional space. Methods of detecting objects using LiDAR sensor outputs (or other three-dimensional sensor outputs) typically rely on converting a three-dimensional point cloud into a two-dimensional feature representation, such as a depth map or a bird's eye view map. Two-dimensional methods, such as two-dimensional CNN-based methods, for object detection and classification can then be applied to the two-dimensional feature representation. These techniques suffer from limitations in detecting smaller objects with nonrigid shapes, such as pedestrians and cyclists, because some information is lost when transforming three-dimensional data into a two-dimensional feature representation.

Other techniques represent three-dimensional point cloud data in a voxel grid and employ three-dimensional CNNs to generate detection results. Processing a voxel representation of a full scene using a three-dimensional CNN utilizes a very large amount of memory. A recently developed three-dimensional object detection network architecture, referred to herein as VoxelNet, addresses the memory usage limitations associated with processing a voxelized representation of a point cloud by encoding the voxels using stacks of voxel feature encoding (VFE) layers. By voxelization and encoding, VoxelNet enables the use of three-dimensional region proposal networks for detection. The systems and methods described herein expand on these techniques to use multiple modalities. For example, images provide dense texture information that can be combined with three-dimensional sensing modalities to improve detection performance.

The systems and methods described herein augment three-dimensional sensor information with semantic image features. Machine learning techniques are used to fuse the three-dimensional sensor information and the three-dimensional image features to improve three-dimensional object detection and classification.

A first technique described herein is referred to as point fusion. Point fusion is an early fusion method where points from the LiDAR sensor are projected onto the image plane, followed by image feature extraction from a pre-trained two-dimensional detector. The concatenation of image features and the corresponding points are then jointly processed by the VoxelNet architecture.

A second technique described herein is referred to as voxel fusion. In this technique, three-dimensional voxels created by VoxelNet are projected to the image, followed by extracting image features for every projected voxel using a pre-trained CNN. These features are then pooled and appended to the voxel features that are determined by the voxel feature encoding layers for every voxel and further used by the three-dimensional region proposal network (RPN) to produce three-dimensional bounding boxes. Compared to point fusion, voxel fusion is a relatively later fusion technique that combines the three-dimensional information with the two-dimensional information at a later stage in the object detection process.

The point fusion and voxel fusion techniques utilize the VoxelNet architecture to encode features on a per-voxel level. The VoxelNet architecture includes use of voxel feature encoding (VFE) layers, convolutional middle layers, and a three-dimensional region proposal network. The VFE layers define a feature learning network that aims to encode raw point clouds at the individual voxel level. Given a point cloud, the three-dimensional space is divided into equally spaced voxels, followed by grouping the points to voxels. Then each voxel is encoded using a hierarchy of voxel feature encoding layers. First, every point $$p_i = [x_i, y_i, z_i, r_i]^T$$

(containing the XYZ coordinates and the reflectance value) in a voxel is represented by its coordinates and its relative offset with respect to the centroid of the points in the voxel. That is each point is now represented as:

$$\tilde{p}_i = [x_i, y_i, z_i, r_i, x_i - v_x, y_i - v_y, z_i - v_z]^{69282} \in \mathbb{R}^7$$

where $x_i$, $y_i$, and $z_i$ are the XYZ coordinates, $r_i$ is the reflectance value and $v_x$, $v_y$, and $v_z$ are the centroids of the points in the voxel to which the $i^{th}$ point $p_i$ belongs. Next, each $\tilde{p}_i$ is transformed through the VFE layer which consists of a fully-connected network into a feature space, where information from the point features can be aggregated to encode the shape of the surface contained within the voxel. The fully-connected network is composed of a linear layer, a batch normalization layer, and a rectified linear unit (ReLU) layer. The transformed features belonging to a particular voxel are then aggregated using element-wise max-pooling. The max-pooled feature vector is then concatenated with point features to form the final feature embedding. All non-empty voxels are encoded in the same way and they share the same set of parameters in the fully-connected network. Stacks of such VFE layers are used to transform the input point cloud data into high-dimensional features.

The output of the stacked VFE layers are forwarded through a set of convolutional middle layers that apply three-dimensional convolution to aggregate voxel-wise features within a progressively expanding receptive field. These layers incorporate additional context, thus enabling the use of context information to improve the detection performance. Following the convolutional middle layers, a region proposal network is included to perform the detection. This network consists of three blocks of fully convolutional layers. The first layer of each block downsamples the feature map by half via a convolution with a stride size of 2, followed by a sequence of convolutions of stride 1. After each convolution layer, batch normalization and ReLU operations are applied. The output of every block is then upsampled to a fixed size and concatenated to construct a high-resolution feature map. Finally, this feature map is mapped to a probability score map and a regression map.

The VoxelNet architecture is based on a single modality. In the implementations that are described herein, the VoxelNet architecture is modified such that point cloud information is combined with image information to enhance object detection. In particular, the voxel-based three-dimensional object detection techniques from VoxelNet are combined with image data either on a per-point basis or on a per voxel basis.

Figure 1:
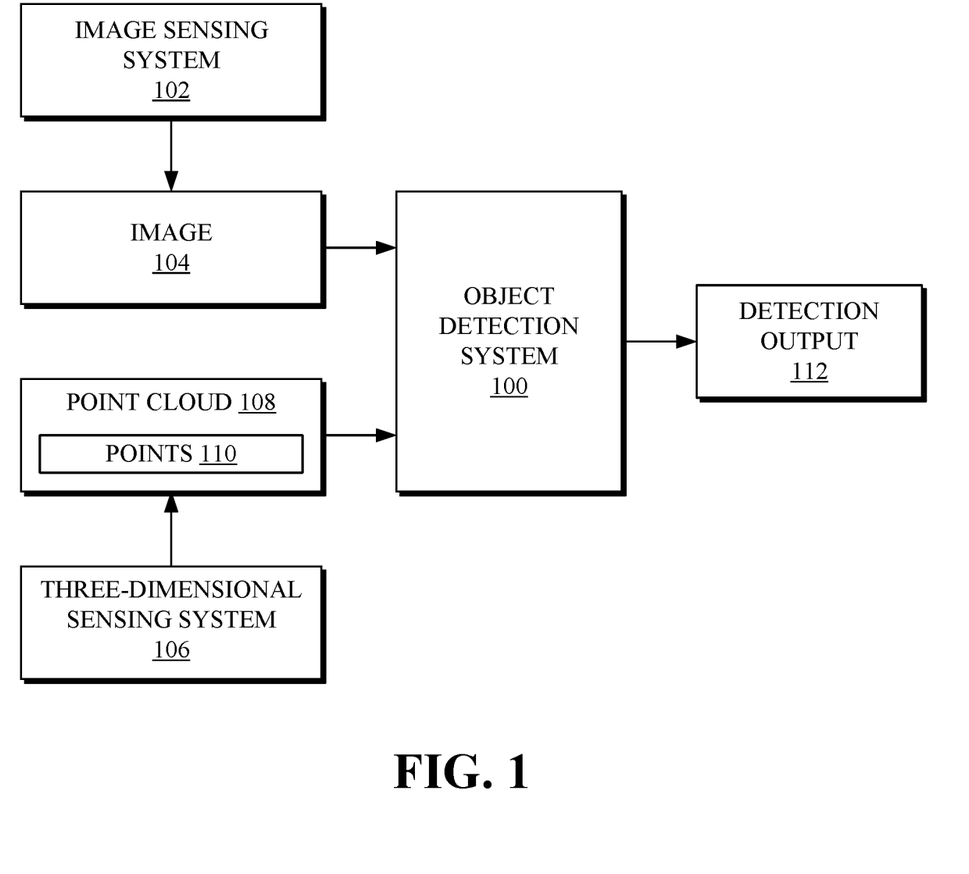
FIG. 1 is a block diagram that shows an object detection system according to a first example.

FIG. 1 is a block diagram that shows an object detection system 100 according to a first example. The object detection system 100 is a multimodal detection system that utilizes multiple (i.e., two or more) inputs of varying types. The object detection system 100 is configured to detect the positions and orientations of three-dimensional objects in three-dimensional space. In the illustrated example the object detection system, the object detection system utilizes two-dimensional inputs (e.g., raster images) and three-dimensional inputs (e.g., measurements and/or locations in three-dimensional space).

In the illustrated example, an image sensing system 102 provides an image 104 (or multiple images) to the object detection system 100 as a first input. The image sensing system 102 may include, for example, one or more still image cameras and/or one or more video cameras. The image 104 (e.g., still images or video frames) may be a digital image in the form of an array of pixels that each have a color value (e.g., expressed in terms of color components in any suitable format).

The image 104 is a visual representation of an environment. Surfaces that form the environment are visible in the image 104. The image 104 may depict objects that are intended to be detected by the object detection system 100.

The image sensing system 102 is an example of one way that the object detection system 100 may obtain the image 104. As other examples, the object detection system 100 could obtain the image 104 by accessing it from a storage device or receiving it in a data transmission.

In the illustrated example, a three-dimensional sensing system 106 provides a point cloud 108 as an input to the object detection system 100. The point cloud 108 is a collection of points 110. Each of the points 110 represents a three-dimensional location (e.g., expressed in XYZ coordinates) where a surface is present. Each of the points may also, in some implementations, include a reflectance value that indicates an amount of energy reflected from the surface back to the source. The reflectance provides useful additional information for scene understanding, as the reflectance value will be dependent upon characteristics of the surface, such as material type.

The points 110 may be determined based on distance measurements that are made by the three-dimensional sensing system 106. For example, the distance measurements may be made from a known sensor location and at a known angular orientation. This information allows the locations for the points 110 to be determined using geometric methods, such as by constructing a ray from the sensor location according to the distance measurement and the angular orientation.

As one example, the three-dimensional sensing system 106 may include one or more LiDAR sensors. Other types of three-dimensional sensors could be used, such as structured light sensors or ultrasonic sensors.

The point cloud 108 is a three-dimensional representation of an environment. Surfaces that form the environment are represented by the points 110 of the point cloud, which are samples that represent presence of surfaces at locations in three-dimensional space. Some of the points 110 correspond to locations of surfaces that are portions of objects that are intended to be detected by the object detection system 100.

In the illustrated example, the point cloud 108, which is a collection of the points 110, is provided to the object detection system 100 as an input. The points 110 are examples of surface samples that represent three-dimensional locations of surfaces of an environment. Information that represents the presence and locations of surfaces in three-dimensional space could be provided to the object detection system 100 in other forms. For example, Surface samples that represent three-dimensional locations of surfaces could be provided to the object detection system 100 in the form of a three-dimensional mesh.

The three-dimensional sensing system 106 is an example of one way that the object detection system 100 may obtain three-dimensional surface samples, such as the point cloud 108. As other examples, the object detection system 100 could obtain the image 104 by accessing it from a storage device or receiving it in a data transmission.

The object detection system 100 is configured to identify the presence, location, and pose (i.e., angular orientation in one or more degrees of freedom) of one or more types of objects. The object detection system 100 can be trained to detect specific types of objects using ground truth samples that show the objects of interest and are annotated with information describing their presence, location, and pose. The configuration and operation of the object detection system 100 will be explained further herein with respect to specific implementations.

The object detection system 100 includes one or more machine learning models that are configured to jointly process the image 104 and the point cloud 108. Based on features from the image 104 and the point cloud 108 that are jointly extracted and classified, the object detection system 100 generates a detection output 112.

The detection output 112 describes the presence, location, and/or pose of one or more of the objects of interest that are present in the environment that is depicted in the image 104 and the point cloud 108. The detection output 112 may include a two-dimensional and/or three-dimensional estimate of position and/or pose. A two-dimensional estimate of position could be output in the form of a bounding box presented in image space relative to the image 104. One example of a three-dimensional estimate of position and pose could be output in the form of XYZ coordinates and rotation values. Another example of a three-dimensional position and pose could be output in the form of a three-dimensional bounding box.

Figure 2:
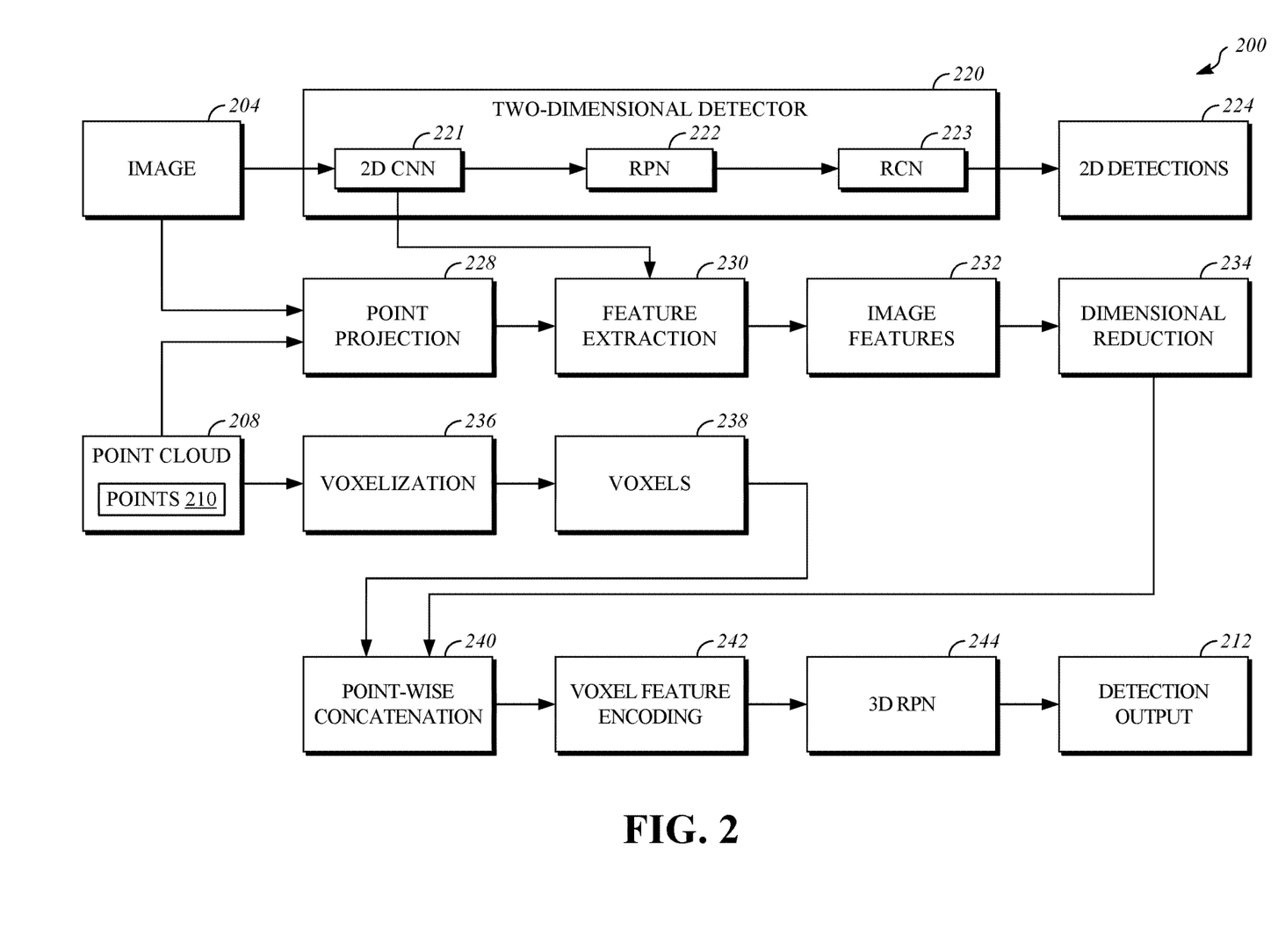
FIG. 2 is a block diagram that shows an object detection system according to a second example.

FIG. 2 is an illustration that shows an object detection system 200 according to a second example. The object detection system 200 implements a multimodal detection technique that is referred to herein as point fusion. Point fusion is an early fusion technique in which image information from one or more images and is appended to the points from a point cloud. The object detection system 200 may be implemented and used in the manner described with respect to the object detection system 100, except as otherwise described herein.

The inputs for the object detection system 200 are an image 204 and a point cloud 208 that includes points 210, which are as described with respect to the image 104, the point cloud 108, and the points 110, and may be obtained in the same manner.

The object detection system 200 may include a two-dimensional detector 220 that processes the image 204 and does not process the point cloud 208. The two-dimensional detector 220 is optional. If included, an intermediate output of the two-dimensional detector 220 may be utilized during multi-modal object detection as will be described, and the final output of the two-dimensional detector 220 may be used as a supplemental detection strategy alongside multi-modal detection, for example, to verify the detections based on consistency.

The two-dimensional detector 220 may be implemented using known two-dimensional detection frameworks and may be trained to detect the objects of interest using conventional methods (e.g., using a training data set and ground truth annotations). In the illustrated example, the two-dimensional detector 220 is implemented according to the Faster-RCNN detection framework and includes a two-dimensional convolutional neural network 221, a region proposal network 222, and a region classification network 223. The two-dimensional detector 220 outputs two-dimensional detections 224. An output of the two-dimensional convolutional neural network 221 may be used in multi-modal detection to provide image information in the form of high-level image features. For example, the two-dimensional convolutional neural network may be a VGG16 network, and high-level features may be extracted from the conv5 layer of the VGG16 network. The region proposal network 222 and the region classification network 223 are not utilized in the multi-modal detection process that is implemented by the object detection system 200.

The image 204 and the point cloud 208 are provided as inputs to a point projection stage 228. As previously described, the points 210 from the point cloud 208 are three-dimensional surface samples that represent the spatial and geometric configuration of surfaces that are depicted in the image 204. The point projection stage 228 correlates each of the points 210 with a portion of the image 204. This correlation may be determined using conventional geometric methods to project three-dimensional features onto two dimensional images. Conceptually, these methods approximate viewing the point cloud 208 from the same perspective that the image 204 is captured from. In practice, this may be performed mathematically in real-time, or may be performed using a predetermined calibration matrix that, dependent on camera and sensor locations and properties, describes relationships between the locations of the points 210 and portions of the image 204. The result of the point projection stage 228 is a correlation between the location of each of the points 210 and the location of a corresponding image portion from the image 204. This correlation may be described in terms of pixel coordinates relative to the image 204 or in any other suitable form. As one example, the image portion may be a single pixel from the image 104. As another example, the image portion may be a patch (e.g., a rectangular grouping) of pixels from the image 204.

Subsequent to the point projection stage 228, each of the points 210 is associated with image information that corresponds to the portion of the image 204 that it was spatially correlated with in the point projection stage 228. In the illustrated example, the image information that is associated with each of the points includes the high-level features extracted from the two-dimensional convolutional neural network 221 in the two-dimensional detector 220, as will be explained. In alternative implementations, the two-dimensional detector 220 may be omitted entirely, and the image information that is associated with each of the points 210 may take another form, such as one or more pixel values (e.g., a single pixel value or a patch of pixel values) from the image portion that corresponds to the respective one of the points 210.

In a feature extraction stage 230, information describing high-level features from the image is received from the two-dimensional convolutional neural network 221 for each of the points 210. The high-level features encode image-based semantics. Dependent on the locations determined during the point projection stage 228, image features 232 are extracted from the received information and associated with each of the points 210. The image features 232 may then be simplified in a dimensional reduction stage 234. For example, the features extracted from the two-dimensional convolutional neural network 221, in the current example, may be five-hundred and twelve dimensional. The dimensional reduction stage 234 can reduce the dimensionality (e.g., to sixteen dimensions) through a set of fully connected layers.

The point cloud 208 is processed by a voxelization stage 236. The voxelization stage 236 is configured to generate a voxelized representation of the point cloud 208. The voxelized representation is defined by voxels 238. The voxels 238 represent volumetric areas (e.g., cubes) in three-dimensional space in which surfaces are believed to be present in the environment, based on the point cloud 208. In one implementation, the three-dimensional space is divided into space portions, and one of the voxels 238 is defined for each one of the space portions in which one or more of the points 210 (or other surface samples) are present. In another implementation, the three-dimensional space is divided into space portions, a three-dimensional mesh is defined based on the point cloud according to known methods, and one of the voxels 238 is defined for each one of the space portions in which part of the three-dimensional mesh is present.

The voxels 238 and the image information (e.g., the image features 232 subsequent to the dimensional reduction stage 234) are combined in a point-wise concatenation stage 240. As previously explained, the image information (e.g., the image features 232) are each associated with one of the points 210 as a result of the point projection stage 228. Likewise, each of the points 210 is associated with one of the voxels 238. Thus, the point-wise concatenation stage 240 establishes a spatial correspondence between the image information and the voxels 238 to allow for subsequent joint processing.

The concatenated features (e.g., voxels 238 and image features 232) are processed by a voxel feature encoding stage 242. The voxel feature encoding stage 242 is implemented using a machine learning model that is configured to encode information that describes the shape of features that are present in each of the voxels 238.

The voxel feature encoding stage 242 can be implemented using stacks of voxel feature encoding layers and convolutional middle layers. The voxel feature encoding layers aggregate the concatenated point features to encode the shape of the surface that is contained inside the voxel. The voxel feature encoding layers may be implemented as fully connected networks that each include a linear layer, a batch normalization layer, and a ReLU layer. The transformed features belonging to a particular voxel are aggregated using element-wise max-pooling. The max-pooled feature vector is then concatenated with point features to form the final feature embedding. All non-empty voxels are encoded in the same way and they share the same set of parameters in the fully connected network. By processing the concatenated features using stacks of the voxel-feature encoding layers, high-dimensional features are generated. The output of the stacked voxel feature encoding layers is forwarded through a set of convolutional middle layers that apply three-dimensional convolution to aggregate voxel-wise features within a progressively expanding receptive field. The convolutional middle layers incorporate additional context to improve detection performance.

Following the convolutional middle layers of the voxel feature encoding stage 242, a three-dimensional region proposal network 244 performs three-dimensional object detection. As an example, the three-dimensional region proposal network 244 may include three blocks of fully convolutional layers in which the first layer of each block downsamples the feature map by half via a convolution with a stride size of 2, followed by a sequence of convolutions of stride 1, after which batch normalization and ReLU operations are applied. The output of every block may then be upsampled to a fixed size and concatenated to construct a high-resolution feature map. This feature map is mapped to the targets, for example, a probability score map and a regression map.

The three-dimensional region proposal network 244 generates the detection output 212, which indicates the presence and three-dimensional position and pose of objects in the environment, as described with respect to the detection output 112.

In summary the processing performed by the object detection system 200 is equivalent to associating prior information about the presence of objects from the image 204 at every one of the points 210 in the point cloud 208. The concatenated features are processed by the set of voxel feature encoding layers according to the VoxelNet architecture and are further used in detection by the three-dimensional region proposal network 244. Because the image features are concatenated at an early stage, the network can learn to summarize useful information from both modalities using the VFE layers. In addition, the object detection system 200 fully utilizes the information contained in the point cloud 208 while placing the image features that correspond to each of the points 210 at the exact three-dimensional locations (e.g., XYZ coordinates) represented by the points 210.

Figure 3:
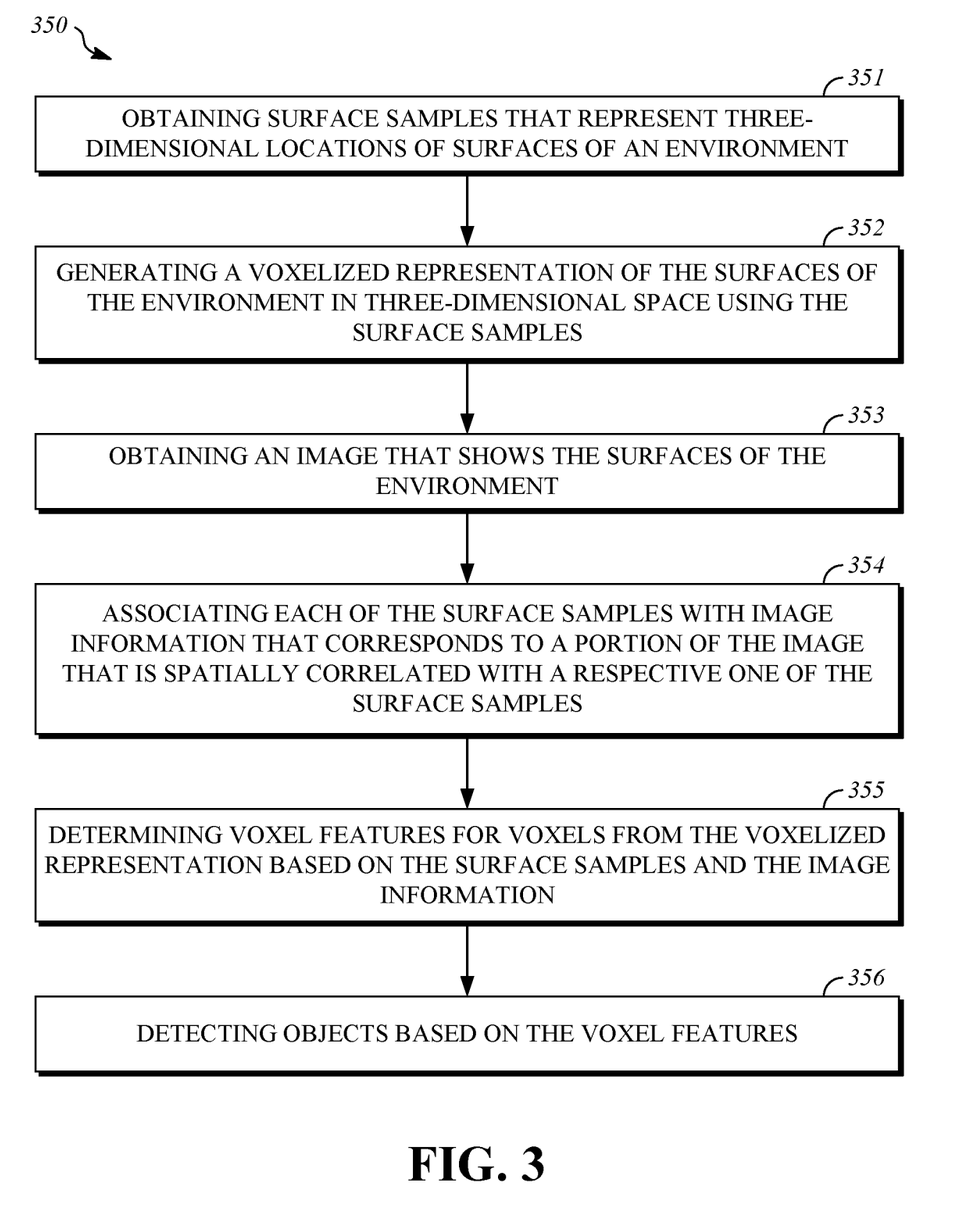
FIG. 3 is a flowchart that shows an object detection process according to a first example.

FIG. 3 is a flowchart that shows an object detection process 350 according to a first example. The object detection process 350 may, for example, be implemented using the object detection system 200 or portions of the object detection system 200. Operations of the object detection process 350 can be caused, controlled, or performed by a computing device. The computing device is provided with instructions that are stored in a storage device or a memory device, and a processor that is operable to execute the program instructions. When executed by the processor, the program instructions cause the computing device to perform the operations of the object detection process 350 as described herein.

Operation 351 includes obtaining surface samples that represent three-dimensional locations of surfaces of an environment.

In some implementations, obtaining the surface samples includes obtaining distance measurements using a three-dimensional sensing system and determining the surface samples based on the distance measurements. For example, the three-dimensional sensing system that is used to obtain surface samples in operation 351 may include one or more LiDAR sensors.

Operation 352 includes generating a voxelized representation of the surfaces of the environment in three-dimensional space using the surface samples.

As an example, the voxelized representation of the surfaces of the environment that is generated in operation 352 may be a volumetric representation in which the three-dimensional space is divided into space portions in which one or more of the surface samples are present.

In some implementations, generating the voxelized representation of the surfaces of the environment in three-dimensional space further may include defining a surface representation in three-dimensional space using the surface samples, and defining the voxels for each space portion in which the surface representation is present.

Operation 353 include obtaining an image that shows the surfaces of the environment. As examples, the image may be obtained by reading it from an image sensing device, by accessing it from a storage device, or by receiving it in a data transmission. In one implementation, the image that is obtained in operation 353 may be obtained using an image sensing system that includes one or more cameras.

Operation 354 includes associating each of the surface samples with image information that corresponds to a portion of the image that is spatially correlated with a respective one of the surface samples. As an example, a spatial correlation of the surface samples with portions of the image may be determined using conventional geometric techniques to project the three-dimensional locations of the surface samples into two-dimensional image space using a known positional relationship of the devices used to capture the three-dimensional surface samples and the two-dimensional images.

The image information that is associated with the surface samples in operation 353 may be a portion of the image (e.g., one or more pixels) or may be information derived from the image (e.g., features determined using one or more pixels from the image). As one example, the image information that is associated with each of the surface samples in operation 354 may include a patch of one or more pixels from the image that was obtained in operation 353. As another example, the image information that is associated with each of the surface samples in operation 354 may include image features that are determined using a second trained machine learning model.

Operation 355 includes determining voxel features for voxels from the voxelized representation based on the surface samples and the image information using a first trained machine learning model, wherein the voxel features each describe three-dimensional shapes present within a respective one of the voxels. As an example, operation 355 may be implemented in the manner described with respect to the voxel feature encoding stage 242 of the object detection system 200.

Operation 356 includes detecting objects based on the voxel features. Detecting objects based on the voxel features can be performed using a trained machine learning model including, for example, a region proposal network. As an example, operation 356 may be performed in the manner described with respect to the three-dimensional region proposal network 244 and the detection output 212.

Figure 4:
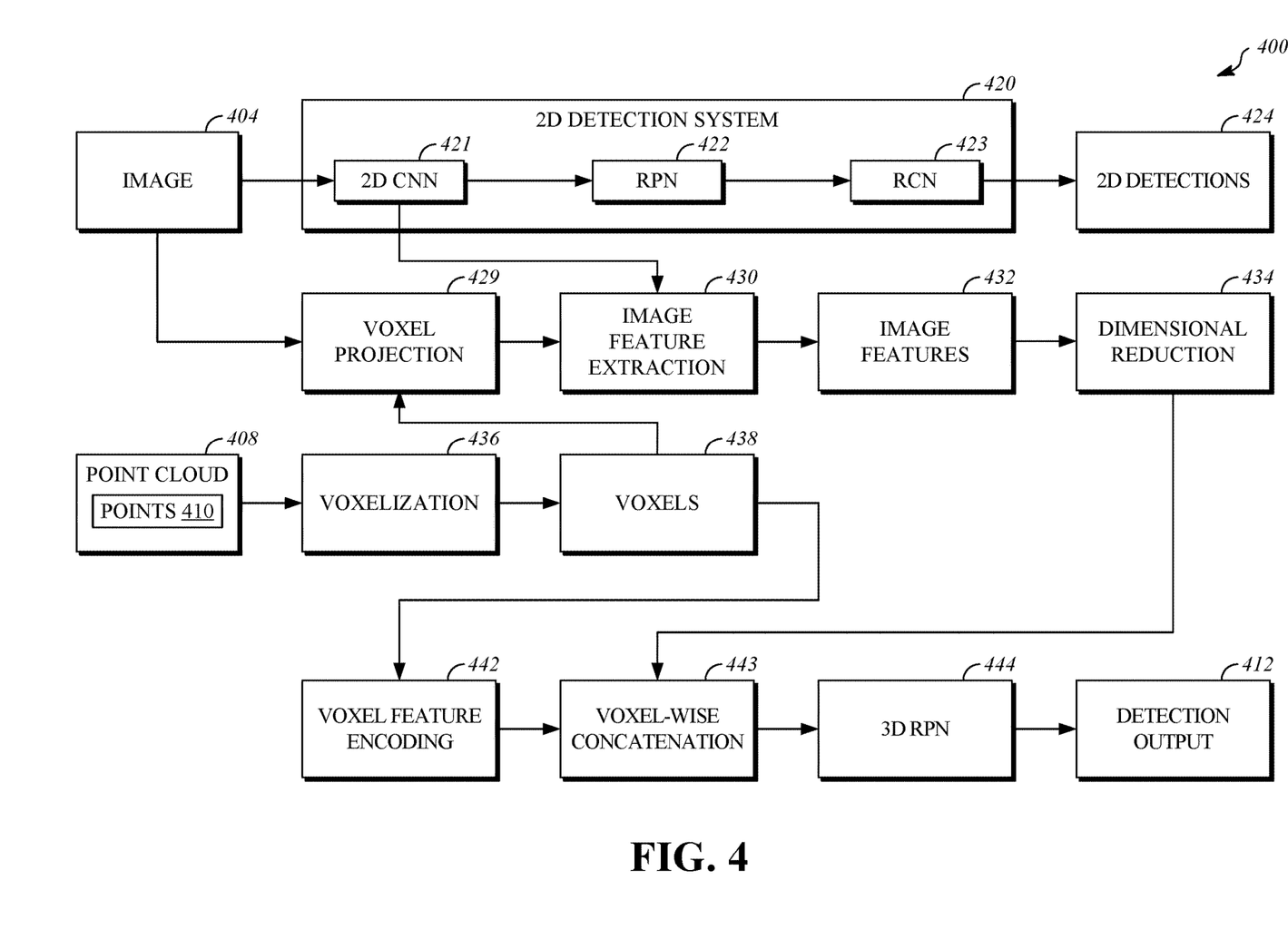
FIG. 4 is a block diagram that shows an object detection system according to a third example.

FIG. 4 is an illustration that shows an object detection system 400 according to a second example. The object detection system 400 implements a multimodal detection technique that is referred to herein as voxel fusion. Voxel fusion is a late fusion method in which image information is combined with voxel features after the voxel features are encoded using a machine learning model. As will be explained further, all of the points inside a voxel contribute to a three-dimensional description of a three-dimensional space that is represented by the voxel. The voxels are projected onto an image to provide an image description of the same space. Fusion is performed at a three-dimensional space level prior to object detection.

The inputs for the object detection system 400 are an image 404 and a point cloud 408 that includes points 410, which are as described with respect to the image 104, the point cloud 108, and the points 110, and may be obtained in the same manner.

The object detection system 400 may include a two-dimensional detector 420 that processes the image 404 and does not process the point cloud 408. The two-dimensional detector 420 is optional. If included, an intermediate output of the two-dimensional detector 420 may be utilized during multi-modal object detection as will be described, and the final output of the two-dimensional detector 420 may be used as a supplemental detection strategy alongside multi-modal detection, for example, to verify the detections based on consistency.

The two-dimensional detector 420 may be implemented using known two-dimensional detection frameworks and may be trained to detect the objects of interest using conventional methods (e.g., using a training data set and ground truth annotations). In the illustrated example, the two-dimensional detector is implemented according to the Faster-RCNN detection framework and includes a two-dimensional convolutional neural network 421, a region proposal network 422, and a region classification network 423. The two-dimensional detector 420 outputs two-dimensional detections 424. An output of the two-dimensional convolutional neural network 421 may be used in multi-modal detection to provide image information in the form of high-level image features. For example, the two-dimensional convolutional neural network may be a VGG16 network, and high-level features may be extracted from the conv5 layer of the VGG16 network. The region proposal network 422 and the region classification network 423 are not utilized in the multi-modal detection process that is implemented by the object detection system 400.

The point cloud 408 is processed by a voxelization stage 436. The voxelization stage 436 is configured to generate a voxelized representation of the point cloud 408. The voxelized representation is defined by voxels 438. The voxels 438 represent volumetric areas (e.g., cubes) in three-dimensional space in which surfaces are believed to be present in the environment, based on the point cloud 408. In one implementation, the three-dimensional space is divided into space portions, and one of the voxels 438 is defined for each one of the space portions in which one or more of the points 410 (or other surface samples) are present. In another implementation, the three-dimensional space is divided into space portions, a three-dimensional mesh is defined based on the point cloud according to known methods, and one of the voxels 438 is defined for each one of the space portions in which part of the three-dimensional mesh is present.

The image 404 and the voxels 438 are provided as inputs to a voxel projection stage 429. As previously described, the voxels 438 represent areas in three-dimensional space where a surface from the environment is present. The voxel projection stage 429 correlates each of the voxels 438 with a portion of the image 404. This correlation may be determined using conventional geometric methods to project three-dimensional features onto two dimensional images. Conceptually, these methods approximate viewing the voxels 438 from the same perspective that the image 404 is captured from. In practice, this may be performed mathematically in real-time, or may be performed using a predetermined calibration matrix that, dependent on camera and sensor locations and properties, describes relationships between the locations of the points 410 and portions of the image 404. The result of the voxel projection stage 429 is a correlation between the location of each of the voxels 438 and the location of a corresponding image portion from the image 404. This correlation may be described in terms of pixel coordinates relative to the image 404 or in any other suitable form. As one example, the image portion may be a single pixel from the image 104. As another example, the image portion may be a patch (e.g., a rectangular grouping) of pixels from the image 404.

Subsequent to the voxel projection stage 429, each of the voxels 438 is associated with image information that corresponds to the portion of the image 404 that it was spatially correlated with in the voxel projection stage 429. In the illustrated example, the image information that is associated with each of the voxels 438 includes the high-level features extracted from the two-dimensional convolutional neural network 421 in the two-dimensional detector 420, as will be explained. In alternative implementations, the two-dimensional detector 420 may be omitted entirely, and the image information that is associated with each of the voxels 438 may take another form, such as one or more pixel values (e.g., a single pixel value or a patch of pixel values) from the image portion that corresponds to the respective one of the voxels 438.

In a feature extraction stage 430, information describing high-level features from the image is received from the two-dimensional convolutional neural network 421 for each of the voxels 438. The high-level features encode image-based semantics. Dependent on the locations determined during the voxel projection stage 429, image features 432 are extracted from the received information and associated with each of the voxels 438. The image features 432 may then be simplified in a dimensional reduction stage 434. For example, the features extracted from the two-dimensional convolutional neural network 421, in the current example, may be five-hundred and twelve dimensional. The dimensional reduction stage 434 can reduce the dimensionality (e.g., to sixteen dimensions) through a set of fully connected layers.

The voxels 438 are processed by a voxel feature encoding stage 442. The voxel feature encoding stage 442 is implemented using a machine learning model that is configured to encode information that describes the shape of features described by the point cloud 408 at the voxel-level with respect to each of the voxels 438.

The voxel feature encoding stage 442 can be implemented using stacks of voxel feature encoding layers and convolutional middle layers. The voxel feature encoding stage 442 uses the voxels 438 and the points 410 contained in each of the voxels 438 to encode the shape of the surface that is contained inside respective one of the voxels 438. The voxel feature encoding layers may be implemented as fully connected networks that each include a linear layer, a batch normalization layer, and a rectified linear unit ReLU layer. The transformed features belonging to a particular voxel are aggregated using element-wise max-pooling. The max-pooled feature vector is then concatenated with point features to form the final feature embedding. All non-empty voxels are encoded in the same way and they share the same set of parameters in the fully connected network. The output of the stacked voxel feature encoding layers is forwarded through a set of convolutional middle layers that apply three-dimensional convolution to aggregate voxel-wise features within a progressively expanding receptive field. The convolutional middle layers incorporate additional context to improve detection performance.

Following the convolutional middle layers of the voxel feature encoding stage 442, the voxel-wise features output by the voxel feature encoding stage 442 and the image information (e.g., the image features 432 subsequent to the dimensional reduction stage 434) are combined in a voxel-wise concatenation stage 443. As previously explained, the image information (e.g., the image features 432) corresponding to each area from the image 404 is associated with one of the voxels 438 as a result of the voxel projection stage 429. Thus, the voxel-wise concatenation stage 443 establishes a spatial correspondence between the image information and the voxel-wise features to allow for subsequent joint processing during object detection.

Using the concatenated features (i.e., voxel-wise features and image features) from the voxel-wise concatenation stage 443, a three-dimensional region proposal network 444 performs three-dimensional object detection. As an example, the three-dimensional region proposal network 444 may include three blocks of fully convolutional layers in which the first layer of each block downsamples the feature map by half via a convolution with a stride size of 4, followed by a sequence of convolutions of stride 1, after which batch normalization and ReLU operations are applied. The output of every block may then be upsampled to a fixed size and concatenated to construct a high-resolution feature map. This feature map is mapped to the targets, for example, a probability score map and a regression map.

The three-dimensional region proposal network 444 generates the detection output 412, which indicates the presence and three-dimensional position and pose of objects in the environment, as described with respect to the detection output 112.

In summary, the processing performed by the object detection system 400 is equivalent to associating prior information about the presence of objects from the image 404 with encoded voxel-wise features at the voxel level for every one of the voxels 438. The concatenated features are used in the detection operation that is performed by the three-dimensional region proposal network 444.

To summarize, the voxel fusion technique that is implemented by the object detection system 400 employs a late fusion strategy where the features from the image 404 are appended to encoded features from the voxels 438 at the voxel level. The voxel fusion technique involves dividing the three-dimensional space into a set of equally spaced voxels. Points are grouped into these voxels based on where they reside, after which each voxel is encoded using a VFE layer according to the VoxelNet architecture. Each of the voxels 438 (i.e., non-empty portions of three-dimensional space) is projected onto the image plane of the image 404 to produce a two-dimensional region of interest, and features from this region of interest may be extracted from the two-dimensional convolutional neural network 421 of the two-dimensional detector 420. These features are pooled to produce a feature vector, whose dimensionality may be reduced before being appended to a feature vector produced by the stacked VFE layers at every voxel, which is equivalent to encoding prior information from two-dimensional images at every voxel.

Figure 5:
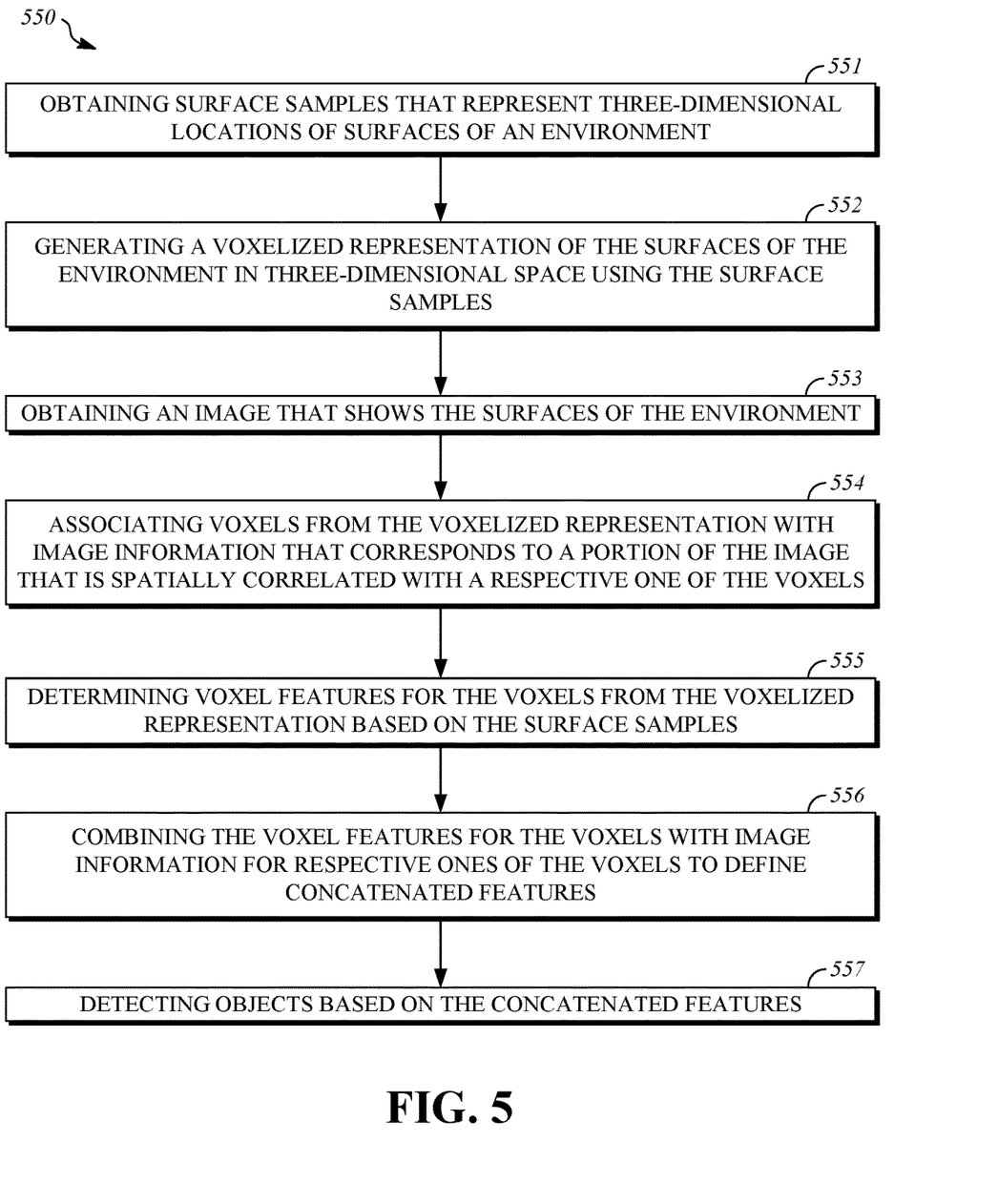
FIG. 5 is a flowchart that shows an object detection process according to a second example

FIG. 5 is a flowchart that shows an object detection process 550 according to a first example. The object detection process 550 may, for example, be implemented using the object detection system 400 or portions of the object detection system 400. Operations of the object detection process 550 can be caused, controlled, or performed by a computing device. The computing device is provided with instructions that are stored in a storage device or a memory device, and a processor that is operable to execute the program instructions. When executed by the processor, the program instructions cause the computing device to perform the operations of the object detection process 550 as described herein.

Operation 551 includes obtaining surface samples that represent three-dimensional locations of surfaces of an environment.

In some implementations, obtaining the surface samples includes obtaining distance measurements using a three-dimensional sensing system and determining the surface samples based on the distance measurements. For example, the three-dimensional sensing system that is used to obtain surface samples in operation 551 may include one or more LiDAR sensors.

Operation 552 includes generating a voxelized representation of the surfaces of the environment in three-dimensional space using the surface samples.

As an example, the voxelized representation of the surfaces of the environment that is generated in operation 552 may be a volumetric representation in which the three-dimensional space is divided into space portions in which one or more of the surface samples are present.

In some implementations, generating the voxelized representation of the surfaces of the environment in three-dimensional space further may include defining a surface representation in three-dimensional space using the surface samples, and defining the voxels for each space portion in which the surface representation is present.

Operation 553 includes obtaining an image that shows the surfaces of the environment. As examples, the image may be obtained by reading it from an image sensing device, by accessing it from a storage device, or by receiving it in a data transmission. In one implementation, the image that is obtained in operation 553 may be obtained using an image sensing system that includes one or more cameras.

Operation 554 includes associating voxels from the voxelized representation with image information that corresponds to a portion of the image that is spatially correlated with a respective one of the surface samples. As an example, a spatial correlation of the voxels with portions of the image may be determined using conventional geometric techniques to project the three-dimensional locations of the voxels into two-dimensional image space using a known positional relationship of the devices used to capture the three-dimensional surface samples and the two-dimensional images.

Operation 555 includes determining voxel features for the voxels from the voxelized representation based on the surface samples using a first trained machine learning model. The voxel features each describe three-dimensional shapes present within a respective one of the voxels. As an example, operation 555 may be implemented in the manner described with respect to the voxel feature encoding stage 442 of the object detection system 400.

Operation 556 includes combining the voxel features for the voxels with image information for respective ones of the voxels to define concatenated features. As an example, operation 556 may be implemented in the manner described with respect to the voxel-wise concatenation stage 443 of the object detection system 400.

The image information that is combined with the voxel features in operation 556 may be a portion of the image (e.g., one or more pixels) or may be information derived from the image (e.g., determined using one or more pixels from the image). As one example, the image information that is associated with the voxel features in operation 556 may include a patch of one or more pixels from the image that was obtained in operation 553. As another example, the image information that is associated with the voxel features in operation 556 may include image features that are determined using a second trained machine learning model.

Operation 557 includes detecting objects based on the concatenated features that were defined in operation 556. Detecting the objects based on the concatenated features can be performed using a trained machine learning model including, for example, a region proposal network. As an example, operation 557 may be performed in the manner described with respect to the three-dimensional region proposal network 444 and the detection output 412 of the object detection system 400.

Figure 6:
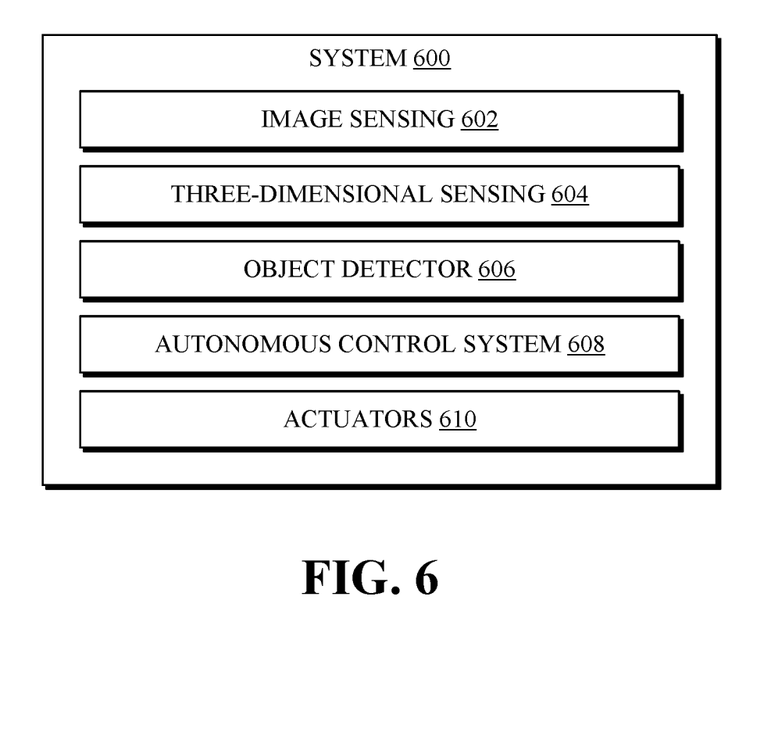
FIG. 6 is a block diagram that shows a system that includes an image sensing system, a three-dimensional sensing system, and an object detector.

FIG. 6 is a block diagram that shows a system 600 that includes an image sensing system 602, a three-dimensional sensing system 604, and an object detector 606. The system 600 may be an autonomously controlled mobile system that uses outputs from the object detector 606. In the illustrated implementation, the system 600 includes an autonomous control system 608 and an actuator system 610.

The image sensing system 602 can include sensors that are operable to obtain two-dimensional images that depict the environment around the system 600. The image sensing system 602 includes imaging sensors such as still-image cameras and video cameras that obtain images in the visible spectrum or the infrared spectrum. The outputs of the image sensing system 602 may be two-dimensional raster images that include pixels having color and intensity values that represent visible light or infrared radiation measured by the imaging sensors. As an example, the sensor outputs from the image sensing system 602 can be images from a still camera or a video camera that obtains visible spectrum images or infrared spectrum images.

The three-dimensional sensing system 604 includes one or more devices that output information that represents presence of matter at discrete locations in three-dimensional space. As an example, the outputs of the three-dimensional sensing system 604 can be three-dimensional point clouds. The three-dimensional sensing system 604 may include, as examples, a LiDAR sensor, a structured-light-stereo sensor, a radar sensor, an ultrasonic sensor, and/or any other suitable three-dimensional sensor device.

The system 600 may also include other types of sensor devices that obtain other types of measurements, such as position, velocity, heading, and acceleration measurements from sensor components such as a satellite positioning sensor (e.g., a GNSS sensor), an inertial measurement unit, and/or an electronic compass.

The object detector 606 is operable to detect the presence of objects, to estimate the positions of the objects in three-dimensional space, and to estimate the orientations of the objects in three-dimensional space. The object detector 606 uses the sensor outputs from the image sensing system 602 and the three-dimensional sensing system 604 as inputs. The object detector 606 may be implemented, in whole or in part, using one or more machine learning models, such as neural networks. In one implementation, the object detector 606 is implemented in the manner described with respect to the object detection system 100. In another implementation, the object detector 606 is implemented in the manner described with respect to the object detection system 200. In another implementation, the object detector 606 is implemented in the manner described with respect to the object detection system 400.

The autonomous control system 608 is operable to control the system 600 using inputs received from the object detector 606 as well as from the image sensing system 602, the three-dimensional sensing system 604, and/or other sensor systems. As an example, the autonomous control system 608 may be configured to determine a trajectory from an origin to a destination. The autonomous control system 608 may utilize information description the positions and orientations of objects from the object detector 606 to determine whether the trajectory can be followed without colliding with the objects, and to modify the trajectory as needed in order to avoid colliding with the object. The autonomous control system 608 may be implemented in the form of software that is executed by a computing device of any type, including general-purpose computing devices, and special purpose computing devices.

The autonomous control system 608 may send commands to the actuator system 610 in order to control motion of the system 600. As examples, the actuator system 610 may include propulsion actuators, braking actuators, steering actuators, and suspension actuators. The commands sent to the actuators may cause motion of the system 600.

Figure 7:
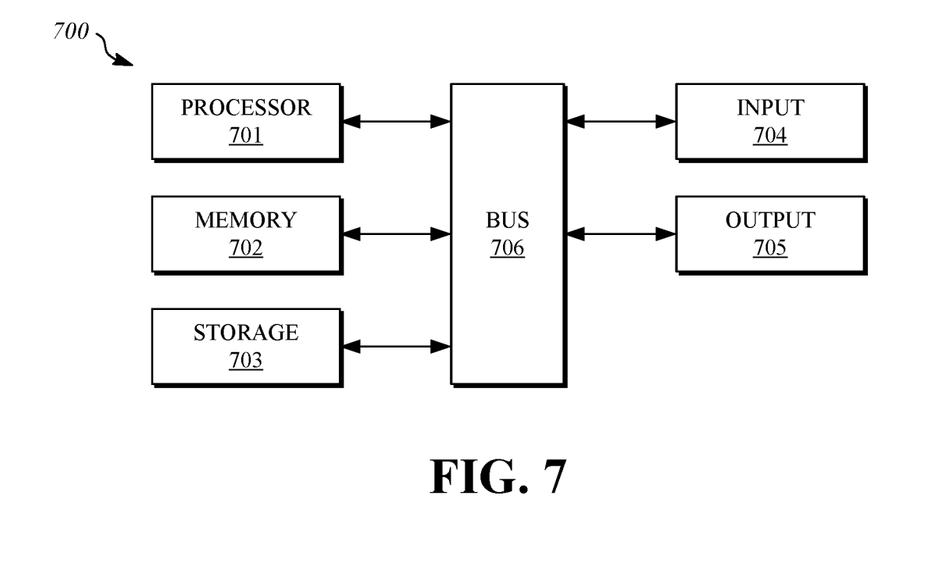
FIG. 7 is an illustration that shows an example of a hardware configuration for a computing device that can be used to implement systems described herein.

FIG. 7 is an illustration that shows an example of a hardware configuration for a computing device that can be used to implement systems described herein. The computing device 700 may include a processor 701, a memory 702, a storage device 703, one or more input devices 704, and one or more output devices 705. The computing device 700 may include a bus 706 or a similar device to interconnect the components for communication. The processor 701 is operable to execute computer program instructions and perform operations described by the computer program instructions. As an example, the processor 701 may be a conventional device such as a central processing unit. The memory 702 may be a volatile, high-speed, short-term information storage device such as a random-access memory module. The storage device 703 may be a non-volatile information storage device such as a hard drive or a solid-state drive. The input devices 704 may include any type of human-machine interface such as buttons, switches, a keyboard, a mouse, a touchscreen input device, a gestural input device, or an audio input device. The output devices 705 may include any type of device operable to provide an indication to a user regarding an operating state, such as a display screen or an audio output.

As described above, one aspect of the present technology is the gathering and use of data available from various sources to detect the presence, location, and pose of objects. The present disclosure contemplates that in some instances, this gathered data may include personal information data that uniquely identifies or can be used to contact or locate a specific person or may be used in the context of a system that gathers and stores such information. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, obtaining images showing the environment around a user involves the gathering and storage of information that describes the location of the user at a particular point in time, but this information can be used to identify objects around the user for use in various applications that provide services to the user. Accordingly, use of such personal information data enables users to calculated control of the delivered content. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select the specific services and functions that personal information data will be used for. In yet another example, users can select to limit the length of time that personal data is stored or used for specific services and functions. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, services can be provided based on non-personal information data or a bare minimum amount of personal information.

What is claimed is:

1. A method, comprising:
    obtaining surface samples that represent three-dimensional locations of surfaces of an environment;
    generating a voxelized representation of the surfaces of the environment in three-dimensional space using the surface samples;
    obtaining an image that shows the surfaces of the environment;
    associating each of the surface samples with image information that corresponds to a portion of the image that is spatially correlated with a respective one of the surface samples;
    determining voxel features for voxels from the voxelized representation based on the surface samples and the image information using a first trained machine learning model, wherein the voxel features each describe three-dimensional shapes present within a respective one of the voxels; and
    detecting objects based on the voxel features.

2. The method of claim 1, wherein obtaining the surface samples includes obtaining distance measurements using a three-dimensional sensing system and determining the surface samples based on the distance measurements.

3. The method of claim 2, wherein the three-dimensional sensing system includes one or more LiDAR sensors.

4. The method of claim 1, wherein the image information includes a patch of one or more pixels from the image.

5. The method of claim 1, wherein the image information includes image features that are determined using a second trained machine learning model.

6. The method of claim 1, wherein obtaining the image is performed using an image sensing system that includes one or more cameras.

7. The method of claim 1, wherein the voxelized representation of the surfaces of the environment in three-dimensional space is a volumetric representation in which the three-dimensional space is divided into space portions in which one or more of the surface samples are present.

8. The method of claim 1, wherein generating the voxelized representation of the surfaces of the environment in three-dimensional space further comprises:
    defining a surface representation in three-dimensional space using the surface samples; and
    defining the voxels for each space portion in which the surface representation is present.

9. An apparatus, comprising:
    a three-dimensional sensor system that is configured to obtain surface samples that represent three-dimensional locations of surfaces of an environment;
    an image sensing system that is configured to obtain an image that shows the surfaces of the environment; and
    an object detection system that is configured to:
        generate a voxelized representation of the surfaces of the environment in three-dimensional space using the surface samples,
        associate each of the surface samples with image information that corresponds to a portion of the image that is spatially correlated with a respective one of the surface samples,
        determine voxel features for voxels from the voxelized representation based on the surface samples and the image information using a first trained machine learning model, wherein the voxel features each describe three-dimensional shapes present within a respective one of the voxels, and
        detect objects based on the voxel features.

10. The apparatus of claim 9, wherein the three-dimensional sensing system includes one or more LiDAR sensors.

11. The apparatus of claim 9, wherein the image information includes a patch of one or more pixels from the image.

12. The apparatus of claim 9, wherein the image information includes image features that are determined using a second trained machine learning model.

13. The apparatus of claim 9, wherein the voxelized representation of the surfaces of the environment in three-dimensional space is a volumetric representation in which the three-dimensional space is divided into space portions in which one or more of the surface samples are present.

14. The apparatus of claim 9, wherein the object detection system is configured to generate the voxelized representation of the surfaces of the environment in three-dimensional space by being further configured to:
   define a surface representation in three-dimensional space using the surface samples; and
   define the voxels for each space portion in which the surface representation is present.

15. A non-transitory computer-readable storage device including program instructions executable by one or more processors that, when executed, cause the one or more processors to perform operations, the operations comprising:
   obtaining surface samples that represent three-dimensional locations of surfaces of an environment;
   generating a voxelized representation of the surfaces of the environment in three-dimensional space using the surface samples;
   obtaining an image that shows the surfaces of the environment;
   associating each of the surface samples with image information that corresponds to a portion of the image that is spatially correlated with a respective one of the surface samples;
   determining voxel features for voxels from the voxelized representation based on the surface samples and the image information using a first trained machine learning model, wherein the voxel features each describe three-dimensional shapes present within a respective one of the voxels; and
   detecting objects based on the voxel features.

16. The non-transitory computer-readable storage device of claim 15, wherein obtaining the surface samples includes obtaining distance measurements using a three-dimensional sensing system and determining the surface samples based on the distance measurements.

17. The non-transitory computer-readable storage device of claim 16, wherein the three-dimensional sensing system includes one or more LiDAR sensors.

18. The non-transitory computer-readable storage device of claim 15, wherein the image information includes a patch of one or more pixels from the image.

19. The non-transitory computer-readable storage device of claim 15, wherein the image information includes image features that are determined using a second trained machine learning model.

20. The non-transitory computer-readable storage device of claim 15, wherein obtaining the image is performed using an image sensing system that includes one or more cameras.

21. The non-transitory computer-readable storage device of claim 15, wherein the voxelized representation of the surfaces of the environment in three-dimensional space is a volumetric representation in which the three-dimensional space is divided into space portions in which one or more of the surface samples are present.

22. The non-transitory computer-readable storage device of claim 15, wherein generating the voxelized representation of the surfaces of the environment in three-dimensional space further comprises:
   defining a surface representation in three-dimensional space using the surface samples; and
   defining the voxels for each space portion in which the surface representation is present.

* * * * *